United States Patent
Veres et al.

(10) Patent No.: US 9,705,753 B2
(45) Date of Patent: Jul. 11, 2017

(54) EXTENSIBLE ANALYTICS AND RECOMMENDATION ENGINE FOR NETWORK TRAFFIC DATA

(71) Applicant: Exinda Networks PTY, Ltd., Toronto (CA)

(72) Inventors: Greg Veres, Waterloo (CA); Sandra Loop, Waterloo (CA)

(73) Assignee: Exinda

( * ) Notice: Subject to any disclaimer, the term of this patent is extended or adjusted under 35 U.S.C. 154(b) by 134 days.

(21) Appl. No.: 14/677,624

(22) Filed: Apr. 2, 2015

(65) Prior Publication Data

US 2016/0294663 A1 Oct. 6, 2016

(51) Int. Cl.
*H04L 12/28* (2006.01)
*H04L 12/24* (2006.01)

(52) U.S. Cl.
CPC .............. *H04L 41/22* (2013.01); *H04L 41/14* (2013.01); *H04L 41/0823* (2013.01); *H04L 41/0893* (2013.01)

(58) Field of Classification Search
CPC ....... H04L 43/12; H04L 43/062; H04L 41/22; H04L 41/14; H04L 41/0823; H04L 41/0893
See application file for complete search history.

(56) References Cited

U.S. PATENT DOCUMENTS

| | | | | |
|---|---|---|---|---|
| 6,405,250 B1* | 6/2002 | Lin | ....................... | H04L 41/046 700/29 |
| 6,765,864 B1* | 7/2004 | Natarajan | ............... | H04L 41/06 370/224 |
| 8,516,586 B1* | 8/2013 | Jensen | ................ | H04L 63/1425 713/153 |
| 2001/0039579 A1* | 11/2001 | Trcka | .................... | G06F 21/552 709/224 |
| 2003/0133443 A1* | 7/2003 | Klinker | ............... | H04L 12/2602 370/353 |
| 2005/0021715 A1* | 1/2005 | Dugatkin | ................. | H04L 43/12 709/223 |
| 2007/0067450 A1* | 3/2007 | Malloy | ............... | H04L 12/2602 709/224 |
| 2007/0206615 A1* | 9/2007 | Plamondon | ........... | H04L 1/1887 370/401 |
| 2011/0069613 A1* | 3/2011 | Phillips | ............... | H04L 43/0876 370/229 |
| 2011/0305141 A1* | 12/2011 | Horovitz | ................. | H04L 43/18 370/241 |
| 2014/0192668 A1* | 7/2014 | Yamany | .............. | H04L 41/5035 370/252 |

(Continued)

Primary Examiner — Robert Wilson

(57) ABSTRACT

A method and system for using plug-in analysis modules to analyze network traffic data is disclosed. The network has computing devices coupled to a network traffic appliance that routes data to and from the computing devices. A plug-in network analysis module is installed on a network traffic recommendation engine. The network analysis module is run to obtain selected network traffic data on the network. The selected network traffic data is analyzed via the network analysis module. A recommendation is output based on the selected network traffic data. A policy is adjusted based on the recommendation to improve the efficiency of the network traffic to the computing devices.

21 Claims, 8 Drawing Sheets

(56) References Cited

U.S. PATENT DOCUMENTS

| | | | |
|---|---|---|---|
| 2015/0236962 A1* | 8/2015 | Veres | H04L 47/225 370/230.1 |
| 2015/0358205 A1* | 12/2015 | Brophy | G06F 9/45558 709/224 |
| 2016/0255009 A1* | 9/2016 | Ramaiah | H04L 47/27 |

\* cited by examiner

EXTENSIBLE ANALYTICS AND RECOMMENDATION ENGINE FOR NETWORK TRAFFIC DATA

COPYRIGHT

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

TECHNICAL FIELD

The present invention relates generally to improving quality of service on a computer network, and, more particularly, to evaluating network traffic via plug-in analysis modules to provide more efficient network service and assist in detecting network problems.

BACKGROUND

Commonly known local area networks (LAN) such as an Ethernet-based network communicate data via packets having a set format. Control of packet traffic in a network is critical to insure balanced communication flow and efficient transmission to devices on the network. Such packets are sent between a source network node and a destination node over a communication medium such as coaxial cable or twisted pair wire. Each packet typically has a header that contains limited routing information and a payload.

The most common method of local area network communication is the Ethernet protocol that is a family of frame-based computer networking technologies for local area networks. The Ethernet protocol is standardized as IEEE 802.3 and defines a number of wiring and signaling standards for the physical layer through means of network access at the Media Access Control (MAC)/Data Link Layer and a common addressing format.

The combination of the twisted pair versions of Ethernet for connecting end systems to the network, along with the fiber optic versions for site backbones, is the most widespread wired LAN technology. Ethernet nodes communicate by sending each other data packets that are individually sent and delivered. Each Ethernet node in a network is assigned a 48-bit MAC address. The MAC address is used both to specify the destination and the source of each data packet in the header. Network interface cards (NICs) or chips on each node normally do not accept packets addressed to other Ethernet nodes.

Various refinements may be used to improve network efficiency to LANs and other devices that result in overall improvements in the performance of networked devices. For example, network appliances such as quality of service (QoS) devices perform prioritization and traffic shaping operations on computer network traffic sent over a network circuit to ensure a more controlled delivery of application data. When a network circuit is being completely utilized, prioritization is used by a QoS device to ensure that the most important application is given preferential access to the network circuit. Traffic shaping attempts to limit certain types of network traffic to a limited amount of bandwidth. The controls of a feature rich QoS device will allow lower priority traffic to use all of the network circuit if no other higher priority traffic is requesting use of the network circuit. Typical QoS devices use policies or rules to govern the prioritization and traffic shaping operations. However, such policies or rules rely on having accurate network traffic data and analysis in order to efficiently function.

Network traffic appliances collect network data such as which applications are on the network, which hosts are sending or receiving data, which hosts are communicating with other hosts and about what, what URLs are being accessed, what is the latency of the network for particular application types, how many packets per second are being processed, and so on. This information can be used for a variety of purposes, including capacity planning, configuration guidance, network trouble-shooting, investigating network user acceptable use violations, monitoring network user behavior, and so on.

There is a wealth of information that may be extracted from network traffic data. This network traffic information may be used for a variety of purposes, including capacity planning, configuration guidance, network trouble-shooting, investigating network user acceptable use violations, monitoring network user behavior, and so on. Yet it requires time, effort, and expertise on behalf of the network manager to investigate and analyze the data, possibly diagnose issues, and to determine a course of action. It would be beneficial if the network management system could proactively analyze the data and diagnose issues and make recommendations for courses of action.

The amount of network traffic data and the different ways it can be analyzed for different purposes is endless. However, analyzing the data properly requires effort that most network administrators do not have time or resources to address. In some cases, even when such data is available, the network administrator doesn't know what course of action that should be taken, given the result of the data analysis.

Additionally different network managers or different industries or different business functions may have different analyses that they would like performed. It would be beneficial if a network traffic analysis system were extensible so the third parties could extend the system to support their desired analysis and recommendations.

SUMMARY

According to one example, a method of analyzing data on network traffic in a network having a plurality of computing devices coupled to a network traffic appliance that routes data to and from the computing devices is disclosed. A plug-in network traffic analysis module is installed on a network traffic recommendation engine. The network traffic analysis module is run to obtain selected network traffic data on the network. The selected network traffic data is analyzed via the network traffic analysis module. A recommendation is output based on the selected network traffic data. A policy is adjusted based on the recommendation to improve the efficiency of the sending and receiving of network traffic to the plurality of computing devices.

Another example is a system for analysis of network traffic data. The system includes a network having a plurality of network devices exchanging data. A network traffic management system is coupled to the network for managing traffic on the network. A network traffic recommendation engine includes a plug-in network data traffic analysis module. The network data traffic analysis module obtains selected network traffic data on the network. The network data traffic analysis module analyzes the selected network traffic data and outputs a recommendation based on the selected network traffic data.

Another example is a network traffic analysis appliance for improving the efficiency of networked computers in processing data. The network traffic appliance includes a network recommendation engine and a storage device coupled to the network recommendation engine. A network interface is provided to collect network traffic data when coupled to a network. A plug-in module is executed by the network recommendation engine. The plug-in module reads data relating to network traffic, analyzes the data, and outputs a recommendation. A quality of service controller routes network traffic in response to the recommendation to increase the processing efficiency of the network.

Additional aspects of the invention will be apparent to those of ordinary skill in the art in view of the detailed description of various embodiments, which is made with reference to the drawings, a brief description of which is provided below.

Figure 1:
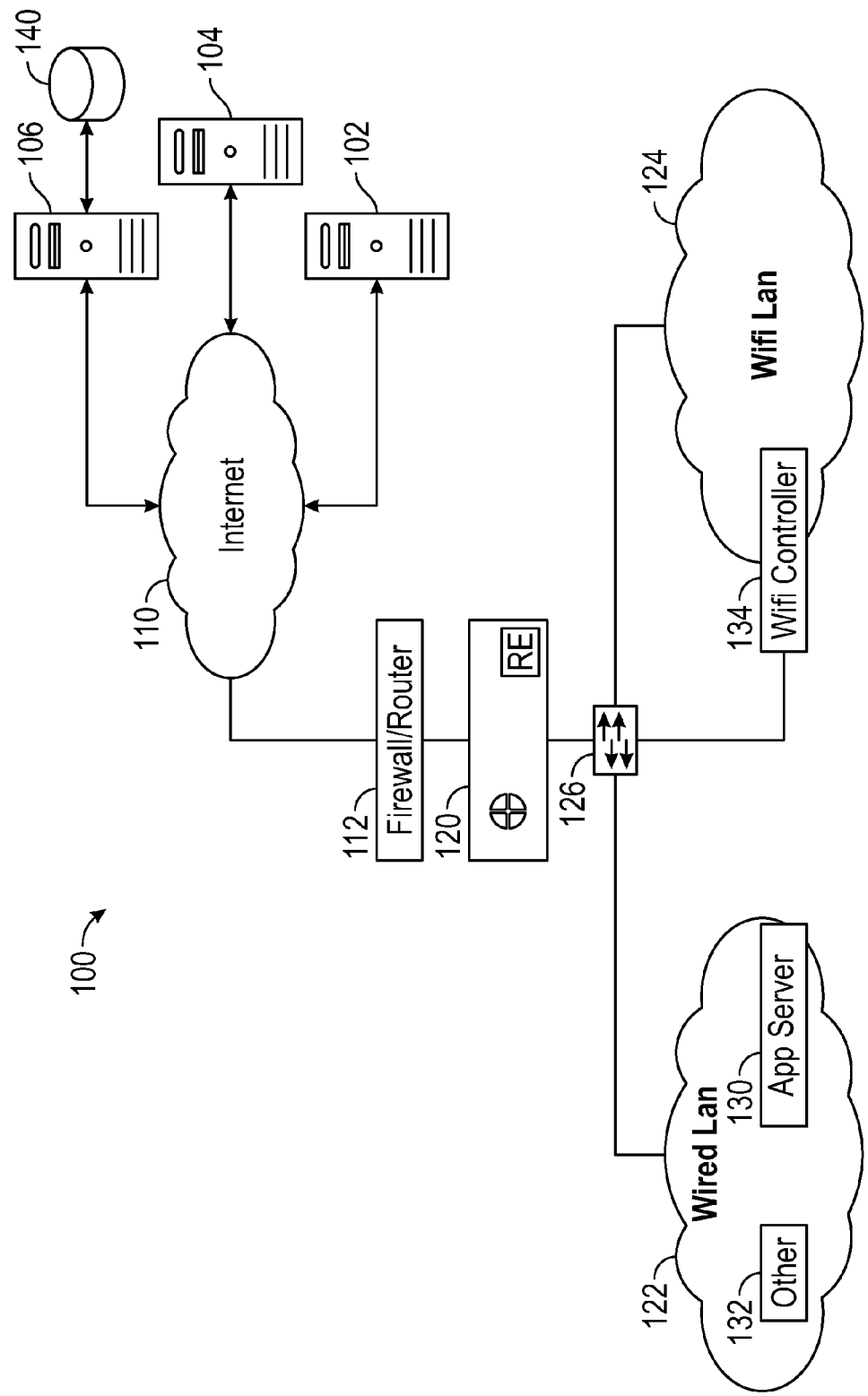
FIG. 1 is a block diagram of an example network system including a network traffic management appliance with plug-in modules for network traffic data analysis.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

FIG. 1 shows a network system 100 that may include a series of one or more application servers 102, 104, and 106 coupled to a wide area network 110. Data traffic from the wide area network 110 is filtered through a firewall router 112 to a traffic management appliance 120. The network traffic management appliance 120 serves as a connector between data traffic between the wide area network 110 and an example wired local area network (LAN) 122 and an example WiFi local area network 124. A local router 126 is coupled to the network traffic appliance 120 and routes data traffic to and from the local area networks 122 and 124. The application servers 102, 104, 106, and the network traffic management appliance 120 may be network nodes of the local area network 122. The wired local area network 122 may also include other nodes such as an application server 130 and other computing devices 132. The WiFi local area network 124 includes a WiFi controller 134 and may include various devices that come in range of the WiFi and wirelessly access the network, which may become temporary network nodes.

It is to be understood that the servers 102, 104, and 106 may be hardware or software or may represent a system with multiple servers that may include internal networks. In this example the servers 102, 104, and 106 may be hardware server devices, which run network based applications such as voice over IP (VOIP) services, P2P services, streaming services, database services, file sharing services, instant messaging, interactive services, mail services, or web services, which are delivered via the wide area network 110. Further, additional servers and workstations and other devices may be coupled to the system 100 or the wired local area network 122 and WiFi network 124 and many different types of applications may be available on servers coupled to the system 100. Each of the network nodes, such as application servers 102, 104, and 106, network traffic management appliance 120, and local application server 130, include a network interface such as a network interface card for establishing a communication channel to another network node. As will be explained below, the network traffic appliance 120 includes a recommendation engine that assists in routing traffic efficiently for the local area networks 122 and 124. The network traffic analysis thus may be used for improved operation of the hardware devices in the network nodes. For example, improved traffic flow allows the use of less expensive or lower speed hardware and use of less storage capacity.

The wide area network 110 may include any publicly accessible network environment, such as the Internet in this example, which includes network components, such as public servers that are not directly managed or under direct control by the network traffic management appliance 120, yet whose operation may still be influenced in response to TCP/IP protocol directives strategically purposefully determined and sent from the network traffic management appliance 120 to make the local area networks 122 and 124, and perhaps the wide area network 110, operate more efficiently, as will be described in greater detail herein. It should be noted, however, that the ensuing descriptions of the various functionalities relating to the servers 102, 104, and 106 are generally applicable to the network devices coupled to the wide area network 110, and thus the remaining description will simply refer to either one as servers 102, 104, and 106 unless noted otherwise.

In this example, the wired local area network 122 may be a local area network (LAN) environment employing any suitable interface mechanisms and communications technologies including, for example telecommunications in any suitable form (e.g., voice, modem, and the like), Public Switched Telephone Network (PSTNs), Ethernet-based Packet Data Networks (PDNs), combinations thereof, and the like. Moreover, the local area network 122 may be made up of one or more interconnected LANs located in substantially the same geographic location or geographically separated, although the local area network 122 may include other types of networks arranged in other configurations. Moreover, the local area network 122 may include one or more additional intermediary and/or network infrastructure devices in communication with each other via one or more wired and/or wireless network links, such as switches, routers, modems, or gateways (not shown), and the like, as well as other types of network devices including network storage devices.

The network traffic management appliance 120 may be interposed between the wide area network (WAN) 110 and the local area networks 122 and 124 as shown in FIG. 1. In this example, the WAN 110 provides users on the LANs 122 and 124 with access to servers and systems on the Internet or in other physical locations. By placing the traffic management appliance 120 with quality of service capabilities between the LANs 122 and 124 and the WAN 110, access to the WAN services may be regulated to ensure that some applications or users have preferential access, thus ensuring efficient use of network resources for critical application use.

From the perspective of the clients of the local area networks 122 and 124, they have directly established a connection in the usual way to the appropriate servers 102, 104, and 106 and respective server applications. The existence of a proxy connection may be entirely transparent to a requesting client computer. The implementation of such a proxy may be performed with known address spoofing techniques to assure transparency, although other methods could be used. The traffic management appliance 120 may provide high availability of IP applications/services running across multiple servers such as the servers 102, 104, and 106.

In this example, various third-party providers may perform network traffic analysis on the LANs 122 and 124 via a plug-in module or modules run on the network traffic appliance 120 as will be explained below. One example may be a separate server such as the server 106 that may be connected to a database 140 to store network traffic information to be used by a plug-in module for network traffic analysis. The third-party provider may provide network services based on the data obtained regarding network traffic by a plug-in module installed on the network traffic appliance 120 and stored in the database 140.

Figure 2A:
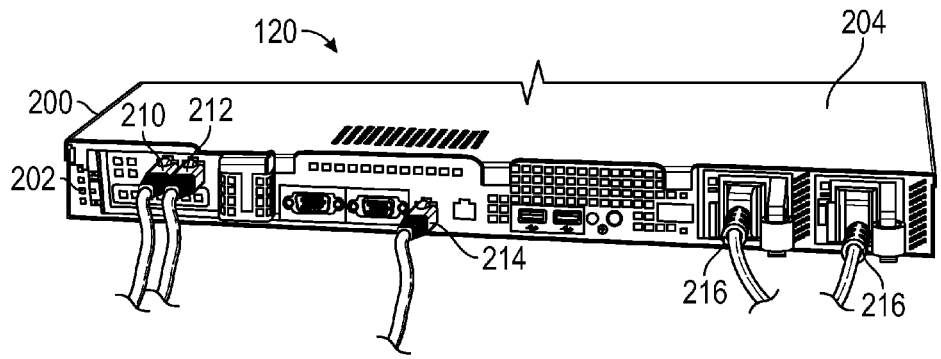
FIG. 2A is a perspective view of the network traffic management appliance in FIG. 1.

FIG. 2 is a perspective view of an example network traffic management appliance 120 in FIG. 1. In this example, the network traffic management appliance 120 may be one of the series 4761 traffic management appliances available from Exinda Networks PTY, Ltd. of Australia. The network traffic management appliance 120 includes a housing 200 for housing the electronic components such as processors, memory devices, and data interfaces. The housing 200 has a top cover 202 and a back wall 204 that includes a variety of ports for connection to different components. The back wall 204 includes a WAN port 210 and a LAN port 212. The WAN port 210 allows connection to a network switch to allow a cable for data traffic to and from the WAN 110 in FIG. 1. The LAN port 212 is coupled to the internal router 126 in FIG. 1 and is connectable to a cable that carries data traffic to and from a LAN or LAN such as the LAN 122 and 124 in FIG. 1. The back wall 204 also includes a management port 214 that provides a data interface to a management interface for controlling the network traffic appliance 120. Such an interface may be via a website, which may be generated by the network traffic management appliance 120. The network traffic management appliance 120 is powered through a power system port 216.

The network traffic management appliance 120 may provide a connection to the wide area network (WAN) 110 and manage traffic to and from the wide area network 110 to the local area networks 122 and 124 and the devices therein. Optimizing the WAN connections to the LANs 122 and 124 allows network administrators to prioritize inbound and outbound traffic on the network circuit coupled to the wide area network 110 based on a variety of factors. Traffic can be prioritized and de-prioritized by application type, who is generating the traffic, and the time of day the request is being made. For example, traffic flowing between a branch office and the head office network can be prioritized over any other traffic. The network traffic management appliance 120 provides all of the core capabilities needed to effectively manage a network circuit such as the network circuit from the WAN 110. These tightly integrated capabilities include real-time monitoring, reporting, traffic control, optimization, and intelligent acceleration.

In this example, the network traffic management appliance 120 may include a controller module 220, network traffic monitoring module 222, and a recommendation module 224. The controller module 220 includes a controller user interface 230, a quality of service (QoS) controller 232, and a WAN optimization controller 234. The QoS controller 232 accesses stored rules or policies for managing network traffic for execution by the QoS controller 232. In FIG. 1, users on the LANs 122 and 124, have all of their traffic flow through the network traffic management appliance 120, which applies its QoS rules and policies from the QoS controller 232. A client computer on the LAN 122 will make a request to a website that may be operated by the server 102 coupled to the WAN 110. For example, a user may log on to a website. This request has to compete with all the other WAN bound requests and responses. The QoS controller 232 shapes the network traffic allocated to the user requests such as that for web access according to the rules (policies) that the user has configured. This allows certain traffic to be guaranteed certain portions of the link and other traffic to be limited to certain portions. Similarly, the WAN optimization controller 234 performs optimization of traffic from a WAN. The optimization controller 234 may thus compress data, eliminate redundancies, and smooth data over the WAN.

The network traffic monitoring module 222 includes a monitoring and reporting user interface 240 that allows a user such as a network administrator to monitor network traffic through the network traffic appliance 120. The network traffic monitoring module 222 also includes a data collection engine 242 that accesses a network traffic database 244 to stored data collected on network traffic. The data collection engine 242 functions by taking samples of data flowing through the network traffic controllers. The data collection engine 242 may separate traffic by applications or IP addresses of network devices. The data collection engine 242 may also monitor inbound and outbound data in terms of counting bits or bytes per second.

The recommendation module 224 includes a manager and results user interface 250 that allows a user to manage the plug-in analysis modules as will be explained below. The recommendation module 224 includes a recommendation analysis engine 252 that exchanges data with both the traffic collection database 244 and an optional third-party database 254. As will be explained below, the recommendation analysis engine 252 includes any number of plug-in analysis modules for analyzing the network traffic data between the LANs 122 and 124 and the WAN 110 in FIG. 1.

In this example, the data collection engine 242 of the network traffic appliance 120 collects network traffic data such as which applications are on the network, which hosts are sending or receiving data, which hosts are communicating with other hosts and about what, what URLs are being accessed, what is the latency of the network for particular application types, and how many packets per second they are being processed. This information may be used for a variety of purposes such as capacity planning, configuration guidance, network trouble-shooting, investigating network user acceptable use violations, and monitoring network user behavior. As will be explained below, the particular type of network traffic data and the application of such data may be tailored via plug-in network traffic data analysis modules that are run by the network traffic appliance 120.

The obtained network traffic data may be used for many different purposes. For example, by monitoring the throughput of the traffic, the network manager may plan for the required capacity of the network. Another example is by monitoring the throughput of the traffic of particular types of traffic, the network manager can change the allocation of particular types of traffic to protect or throttle the amount of bandwidth available for particular types of traffic. By monitoring how the traffic is classified, the system can provide guidance on how to configure the network from the network traffic appliance 120. By monitoring the number of packets per second being processed, the network manager can determine if there is a denial of service attack. Another example is by analyzing users that are involved in large BitTorrent downloads, the network manager can address copyright violation warnings. By monitoring network user behavior, the HR department can determine if users are visiting undesirable websites. By monitoring network user behavior, the company can track who is using which corporate assets.

The example network traffic appliance 120 can automatically perform network traffic data analysis and make recommendations and report to the administrative user, if required, by executing one or more analysis plug-in modules. The plug-in analysis modules eliminate the need for in-depth network data traffic analysis and interpretation by the administrative user. The network traffic appliance 120 can present the information to the user on-screen such as through a browser enabled device, via SMS, or by another method. The system may allow the administrative user to opt-out of these recommendation options. As will be explained below, the administrative user may opt out of all notifications or notifications for a particular analysis plug-in module. For example, a particular login role may not need to receive any notifications. An administrative user may want to opt-out of the notification from a particular data analysis plug-in module since a user does not want to be bothered by the type of recommendation from the particular module. Given the unlimited number of data analysis algorithms and data sources, a comprehensive recommendation engine such as the recommendation engine 252 includes plug-in architecture to be extensible by the vendor of the network traffic appliance as well as third parties such as customers and partners that may author other plug-in data analysis modules.

Figure 2B:
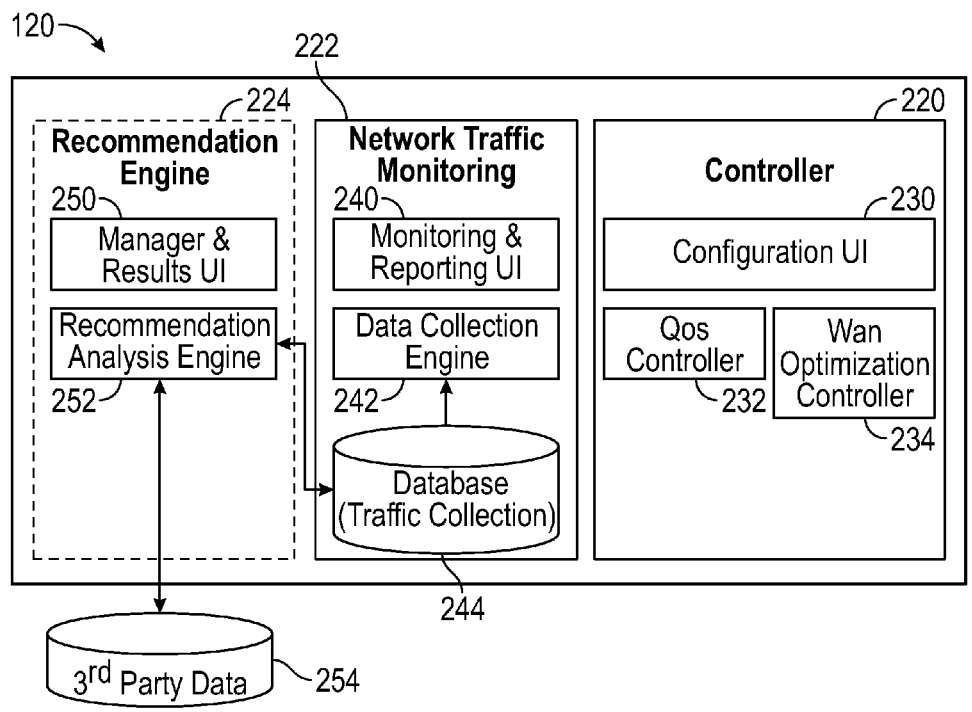
FIG. 2B is a block diagram of the components of the network traffic management appliance in FIG. 1.
Figure 3:
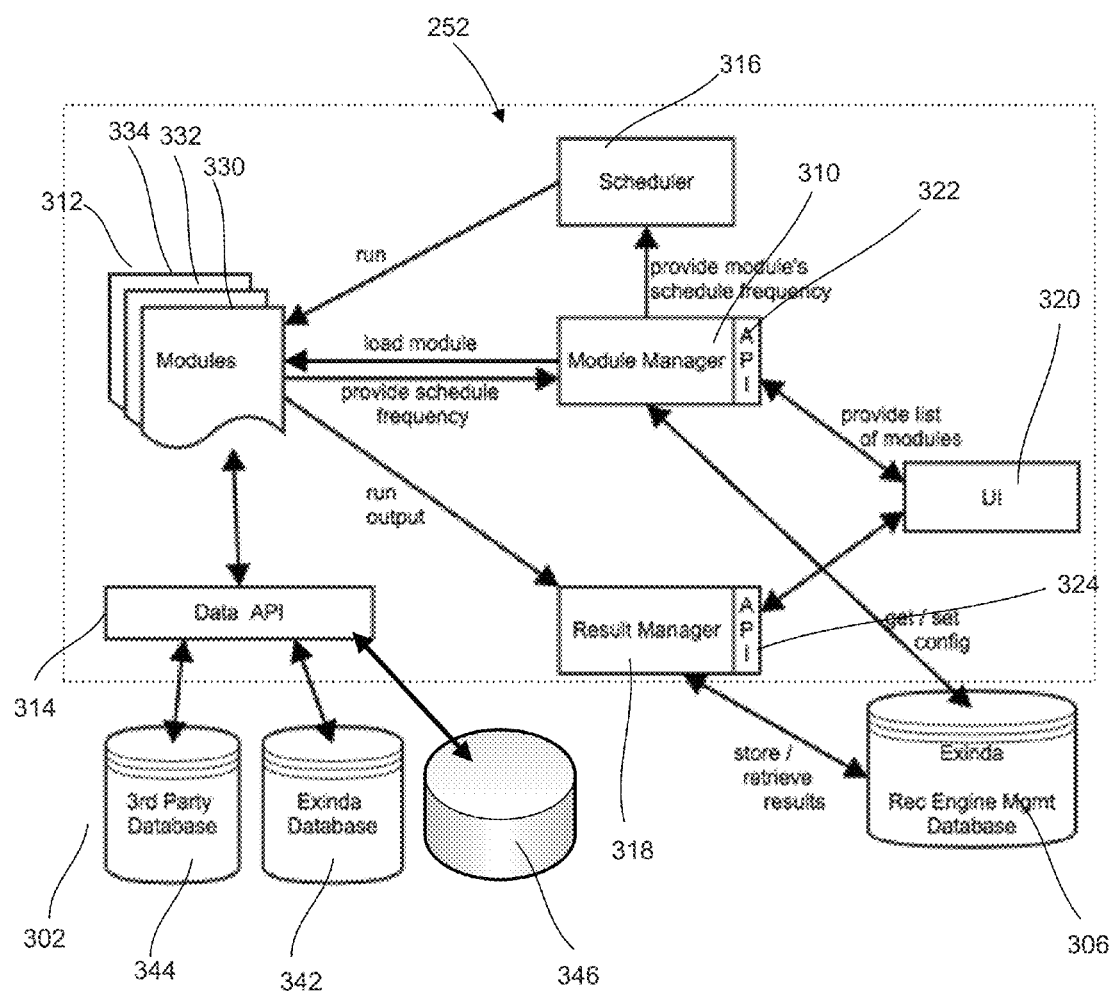
FIG. 3 is a block diagram of the network traffic recommendation engine of the network traffic management appliance in FIG. 1 for analyzing network traffic data using plug-in modules.

FIG. 3 shows a block diagram of the recommendation analysis engine 252 that is part of the network traffic appliance 120 that may be connected to the wide area network 110 in FIG. 1 to monitor and analyze network traffic data to improve the efficiency of operating the computing devices of the network and the network itself. The recommendation analysis engine 252 includes a series of databases 302 that may include a third-party database such as the database 254 in FIG. 2B and databases associated with a network appliance such as the network traffic appliance 120 in FIG. 1. The data analysis is stored in an engine management database 306. In this example, the databases 302 and 306 are shown to reside outside of the network traffic appliance 120, but it is understood that any of the databases 302 and 306 may be stored internally within memory devices such as a memory device in the network traffic appliance 120 in FIG. 2. The recommendation analysis engine 252 includes a module manager 310, a series of plug-in modules 312, a data API 314, a scheduler module 316, a results manager 318, and a user interface module 320.

The module manager 310 is typically run on the network traffic appliance 120 in FIG. 1. The module manager 310 manages the plug-in analysis modules 312 for analyzing network data. The module manager 310 supplies a list of the plug-in analysis modules and determines which modules will run. The module manager 310 also applies configuration data for each of the plug-in analysis modules 312. The module manager 310 provides a way to load new plug-in analysis modules for analyzing network traffic data. As explained above, such plug-in analysis modules may be supplied or authored from either the administrative user of the network, the supplier of the hardware or software of the network traffic appliance 120, or a third-party back end service provider. The module manager 310 provides the list of plug-in analysis modules 312 available to the user interface 320 via a module manager API 322. The module manager 310 stores the configuration of the enabled modules from the modules 312, such as different parameters for the modules, if they are enabled or not, and who should be notified, among many other possible configuration parameters. The module manager 310 gets the schedule frequency from the specific plug-in analysis module or modules 312 and informs the scheduler module 316 of the schedule to run the plug-in analysis modules 312.

As explained above, the collection of plug-in analysis modules 312 includes the plug-in modules that perform different network traffic data analysis. As explained above, any party may create such a plug-in analysis module to interface with the recommendation analysis engine 252. The plug-in analysis modules 312 generally will analyze network traffic data for a specific purpose or purposes and create recommendations based on the analysis of the network data. Three types of common recommendations generated by the plug-in analysis modules may be: a) improved configuration of the network; b) changed network traffic patterns; and c) identification of server or other network devices that may require attention or maintenance. In this example, the group of plug-in analysis modules 312 includes an improper configuration data analysis module 330, a change in traffic trend data analysis module 332, and an operational status data analysis module 334.

The policy engine in the QoS controller 232 in FIG. 2B has configured policy rules for all the network traffic that passes through the network traffic appliance 120. These policy rules are typically configured by the network administrator. If there is network traffic that does not match any of the rules, the network traffic appliance 120 puts the non-matching network traffic into an automatically created auto-catch-all rule. When network traffic falls in the auto-catch-all, the rule is minimal and doesn't provide control, protection, or acceleration of traffic in each category. This is considered a misconfiguration of the policy rules and may prevent effective network traffic management.

The improper configuration plug-in analysis module 330 identifies when the auto-catch-all policy is capturing data and notifies the network administrator. In this example, the improper configuration plug-in analysis module 330 is scheduled to run once a day, overnight for the network. It is expected that the network administrator will take action to clean up the configuration relatively soon and therefore in one of the next executions of the improper configuration plug-in analysis module 330, the network administrator will be able to determine if the reconfiguration is sufficient. Alternatively, the network administrator may not take action and thus may want to turn off notifications of this type from the improper configuration plug-in analysis module 330.

The example traffic trend plug-in analysis module 332 detects new applications appearing in the top ten applications in recent history of a network such as the wired LAN 122 in FIG. 1. Network administrator users are generally concerned with changes in traffic patterns as it indicates something new may be occurring in the network that needs to be monitored. When a new application enters the top ten applications, typically the new application is consuming a significant amount of the network bandwidth. Such an application could be business critical and need protection from other traffic, or could be non-business critical and could impact the bandwidth available for other business critical applications. Thus, the network administrator typically would want to be made aware of the impact of the new application so that an appropriate rule is in place for the policy engine of the QoS controller 232 to manage network traffic efficiently.

In this example, each day, the traffic trend plug-in analysis module 332 determines the top ten applications run on the network for the day and stores the results in the results database 306 in FIG. 3. It compares the top ten applications of the current day with the top ten applications stored for the previous seven days. If there is an application in the top ten applications of the current day that was not in any of the top ten applications of the preceding seven days, then the administrator user is notified. This allows a rule to be put in place for the policy engine for the new application. The traffic trend plug-in analysis module 332 in this example is scheduled to be run once a day overnight. The notifications may be turned off for some of the administrative users of the system. For example, if a chief information officer occasionally logs on to take a look at the traffic or to generate a report, that administrative user may not want to see the notifications from the traffic trend module 332.

One example of the traffic trend plug-in module 332 that is triggered once a day after midnight is the following code:

```
top_10_apps = Query the Exinda data collection database
Store the top_10_apps + date in the Exinda data collection database
       for each app in top_10_apps {
       not_found = true
          for each of the preceding seven days {
          if the app is in top_10_apps, then not_found = false
          }
       if not_found {
          store app in the recommend engine management database with
other interesting info (e.g. the rank of the app within the top 10, the
% of bandwidth that the app consumed, etc.)
          }
       }
   Query the results that were just added to the recommend engine
management database for apps that were new to the network
     For each app {
     Query the controller to determine if there is a policy for this app
already
     Display this info in the recommendation results UI with the
message that the user should investigate whether to add or modify
the policy for this app
     }
```

The example operational plug-in analysis module 334 detects whether a server or other device on the network managed by the network traffic appliance 120 has an unusual amount of aborted and refused TCP connections. When particular network servers have an unusually high amount of aborted or refused TCP connections, it indicates a problem that will likely affect the network users' experience of the network performance for a user even though the server may have a potential problem. Determining the particular server that refuses or aborts TCP connections may allow investigation of the identified server to determine hardware or software faults.

The operational plug-in analysis module 334 evaluates whether any IP address has an unusually high number of TCP aborted connections, TCP refused connections, or TCP ignored connections over a predetermined period such as every 15 minutes. In this example, the operational plug-in analysis module 334 is scheduled to run several times a day so that server issues may be detected relatively early. If the notification repeatedly occurs and the user is unable to identify the source of the problem with the server, the user may choose to turn off the notification for the specified server.

Each of the plug-in analysis modules 330, 332, and 334 in this example analyze network traffic data from the network 100. The desired data is retrieved by the module via the data API 314 from one of the databases such as the database 302 or 304. Each of the plug-in analysis modules 312 analyzes specific types of network traffic data for a specific purpose or purposes and may provide recommendations to the network traffic appliance 120. The plug-in analysis modules 312 each list the types of recommendation that are provided. These recommendations may be controlled by the network administrator. The plug-in analysis modules 312 each run the data analysis when its "run" API is called by the scheduler 316. The plug-in analysis modules 312 each send recommendations to the results manager 318 (if a recommendation is output), which are in turn stored in the recommendation database 306. The plug-in analysis modules 312 may also send analyzed data to be stored in one of the input databases 302 for further operation of the plug-in analysis module or other modules.

The scheduler module 316 invokes the plug-in analysis modules 312 at the appropriate time. The scheduler module 316 calls a particular module's "execute" method that is the trigger to see if an event is happening at the appropriate time. The scheduler module 316 may be programmed to schedule a particular plug-in analysis module's run time to minimize the load on the recommendation analysis engine 252 by not running multiple plug-in analysis modules simultaneously. When new plug-in analysis modules are added, the scheduler 316 attempts to re-arrange the run schedule to accommodate the newly added plug-in analysis modules.

One aspect of running data analysis modules is the scheduling of when to run them. Some plug-in analysis modules require being run at precise times where as others can be flexible in when they can be run. The plug-in analysis modules 330, 332, and 334 also communicate to the module manager 310 what run schedule is required and how strict the timing needs to be. For example, certain plug-in analysis modules include time critical data analysis such as connection status, software updates, or warnings, while other modules do not rely on data that is time critical. The scheduler module 316 will thus prioritize certain plug-in analysis modules based on the criticality of timing to the function of the plug-in analysis module. The system protects the resources of the underlying hardware to be used for its main purpose (for example to run the traffic shaping appliance code by the QoS controller 232 in FIG. 2). As a result, not all plug-in data analysis modules may be able to run at their desired time. In this instance, the scheduler module 316 will attempt to run all the plug-in data analysis modules 312 at their desired time that have a critical run time which is not flexible. The scheduler module 316 will then run other plug-in data analysis modules as close to their desired time as possible, scheduling them to be run after the critical modules have finished execution for that time slot.

The results manager 318 handles the output of the plug-in analysis modules 312. The results manager 318 accepts the output from the plug-in analysis modules 312 in the form of recommendations and stores the output for future viewing in the recommendations database 306. The results manager 318 is coupled to the user interface 320 via a user interface API 324 and allows the display of the output of the plug-in analysis modules generated from the user interface module 320. Alternatively, the results manager 318 may communicate in other means such as sending an email to a network administrator with the results. Other outputs such as a webpage accessible from a web-enabled device coupled to the network may also be used.

As explained above, each plug-in analysis module 312 determines the frequency that it will run to analyze the network traffic data. Each plug-in analysis module may report its own output via the results API 324 of the result manager 318, so that the recommendation analysis engine 252 controls the reporting of the notification regarding the plug-in analysis module as described above. The recommendation analysis engine 252 provides all module management, such as installing and uninstalling plug-in analysis modules via the module manager 310, allowing the user to activate and deactivate the modules, and showing which plug-in analysis modules are installed and active via the user interface 320.

For example, in order to install a new plug-in analysis module to the plug-in modules 312, the user interface 320 would pass an install command to the API 322 of the module manager 310. The module manager 310 would load the new plug-in analysis module to the plug-in analysis modules 312. The new plug-in analysis module provides a schedule frequency to the module manager 310. The module manager 310 provides the schedule frequency of the new plug-in analysis module to the scheduler 316. The module manager 310 also gets the configuration of the new module and sets the configuration for storage in the recommendation engine database 306.

Another example is the execution of one of the plug-in analysis modules 312. The scheduler 316 initiates the execution of the plug-in analysis module according to the stored schedule. The designated plug-in analysis module then obtains necessary data through the data API 314 from the appropriate database such as the databases 342, 344, and 306. The plug-in analysis module takes the obtained data and executes analysis on network traffic and provides the output to the results manager 318. The results manager 318 stores the results in the recommendation engine database 306. The results manager 318 also passes the results to the user interface 320 for display to the user.

Figure 4:
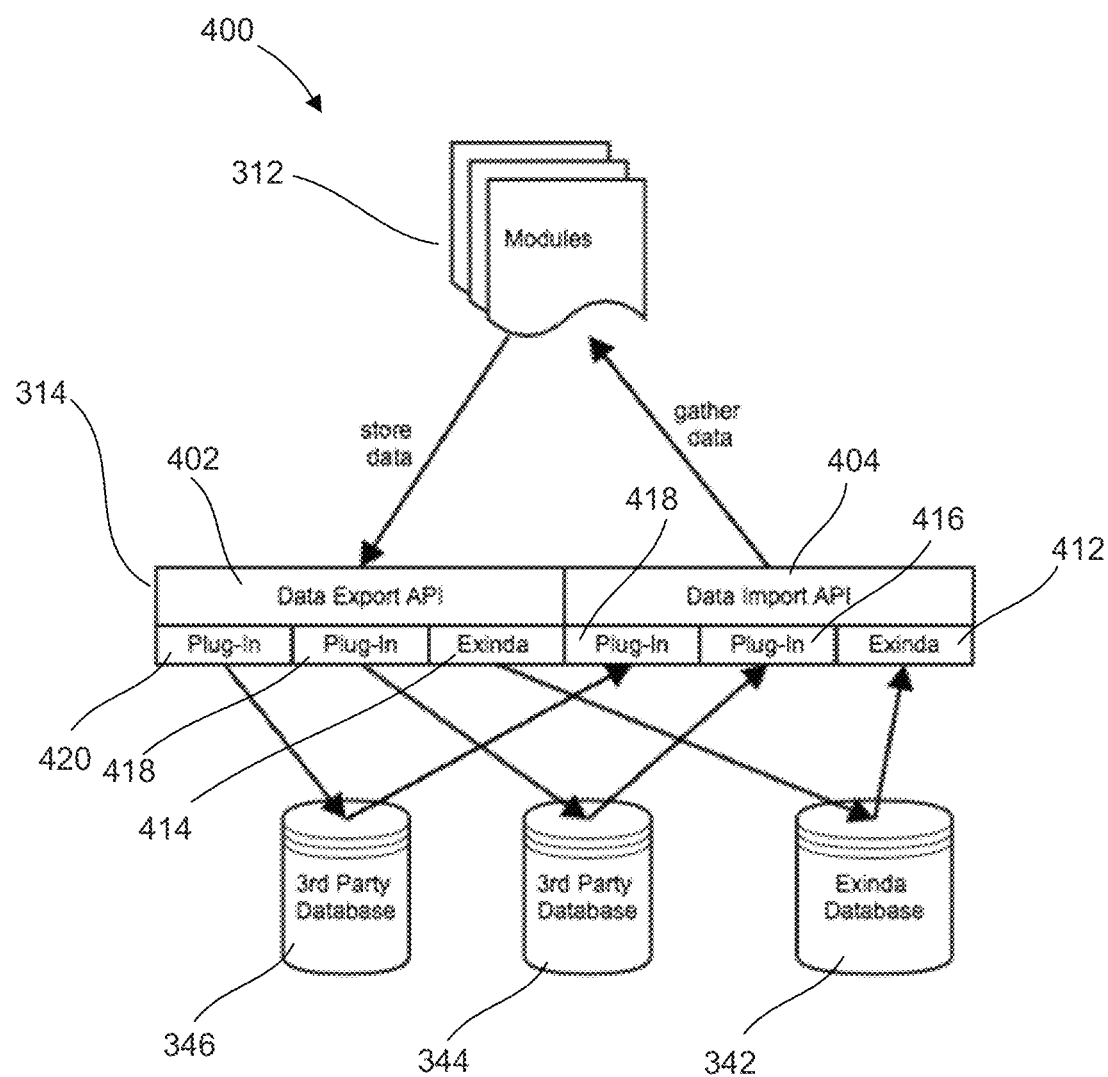
FIG. 4 is a block diagram of the data interface between the plug-in modules and the databases storing network traffic data.

As explained above the data API 314 serves as the interface between data in the databases 302 and the plug-in analysis modules 312. The input databases may include a database 342 compiled by the network traffic appliance 120 and third-party databases 344 and 346. FIG. 4 is a detailed block diagram of the data API 314 and its interaction with the plug-in analysis modules 312 and the databases 342, 344, and 346. As may be seen in FIG. 4, the data API 314 includes an export data API 402 and an import data API 404. The export data API 402 manages data that is output by the plug-in analysis modules 312 and stored in the respective databases 342, 344, and 346 for purposes of future data analysis that requires data from past analysis. The import API 404 manages data that is requested from the modules 312 from the respective databases 342, 344, and 346 for purposes of running analysis of network traffic data. Each of the databases 342, 344, and 346 have respective plug-ins for both exporting and importing data. These plug-ins data APIs are used to translate data between the plug-in analysis modules and the databases. As shown in FIG. 4, the database 342 has an associated export plug-in 412 and import plug-in 414, the database 344 has an associated export plug-in 414 and import plug-in 416, and the database 344 has an associated export plug-in 418 and import plug-in 420.

The data APIs 314 in this example support multi-tenancy, so any plug-in analysis module 312 may be run against the appropriate data but can be isolated from other users if it is desired to protect the data. In this example, on the network traffic appliance 120, a tenant may have zero or more virtual circuits and there may be multiple tenants on each network traffic appliance. On a central management product managing multiple networks, a tenant may have one or more appliances each associated with at least one of the managed networks and zero or more virtual circuits. Thus, on a single network traffic appliance, the network traffic data could apply to the whole network traffic appliance or just a virtual circuit. In central management relating to management of multiple but separate networks such as the LANs 122 and 124 in FIG. 1, the network traffic data could apply to several entire network traffic appliances each with an associated network, or just one virtual circuit on one network traffic appliance, or one virtual circuit on a first network traffic appliance and another virtual circuit on a second network traffic appliance relating to a separate network.

FIG. 4 illustrates that the data access layer 314 is also extensible through data import and export plug-in APIs. The recommendation analysis engine 252 by default provides access to the standard system data and has a plug-in architecture to provide access to data from other systems via data plug-ins such as the plug-in data APIs 412 and 414 to the plug-in analysis modules 312.

Since there are many purposes for potential data analysis, third parties can create plug-in analysis modules that will analyze the data according to a particular need and have the outcome and recommendation presented to the user integrated with the system user interface 320 in a unified consistent manner with the other plug-in analysis modules 312. The plug-in analysis modules 312 that are operated by the recommendation analysis engine 252 can access the data collected from the network traffic appliance 120 in FIG. 2 or from other data sources, including data output from other modules via the data API 314. Each plug-in analysis module may have corresponding data input plug-in APIs and data export plug-in APIs to allow the plug-in analysis module to interface with different data formats.

Figure 5:
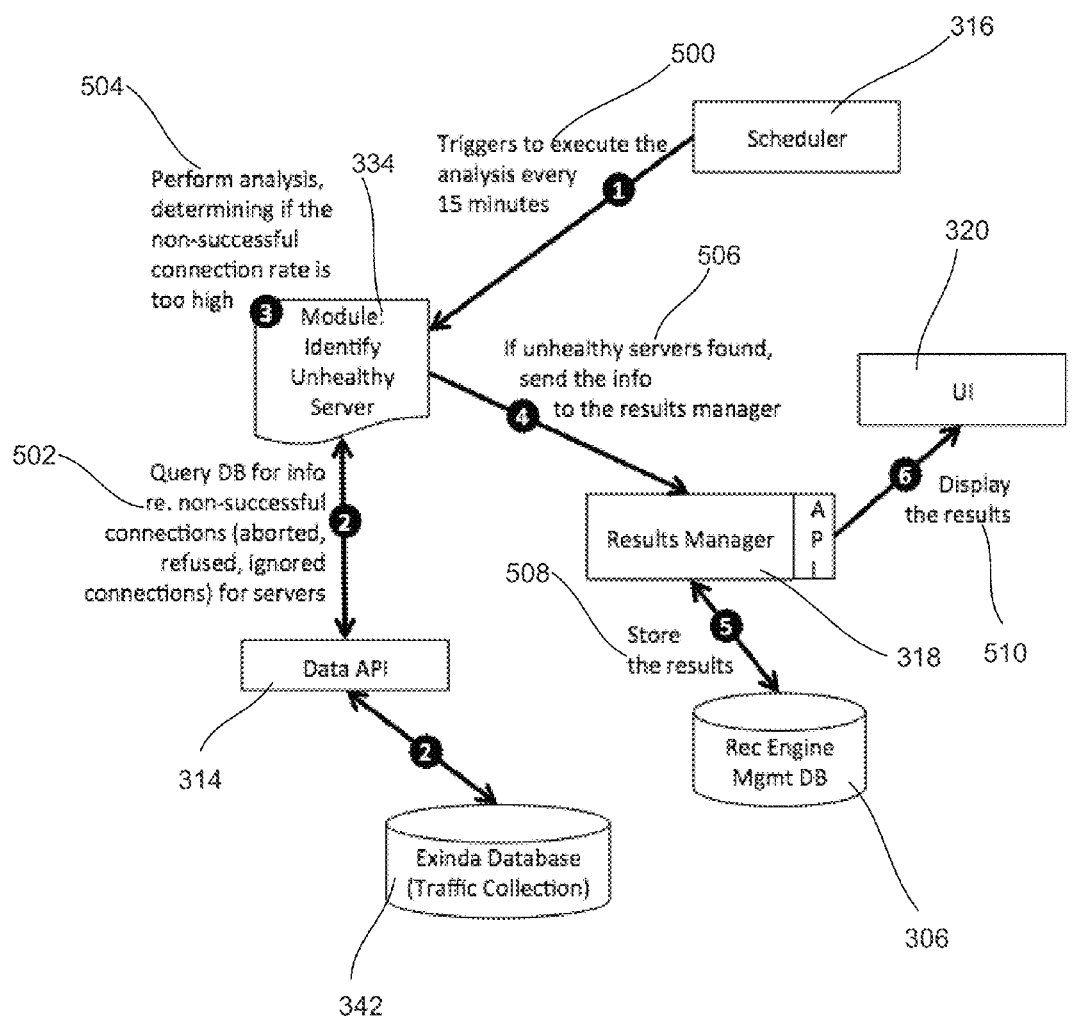
FIG. 5 is a flow diagram of an example execution of a plug-in analysis module directed toward determining analysis of server performance based on network traffic data.

FIG. 5 is a block diagram of the execution of an example plug-in analysis module such as the operational status plug-in analysis module 334 in FIG. 3. The operational status plug-in module 334 in this example analyzes IP addresses representing network devices for abnormalities in connections such as an unusually high number of TCP aborted connections, TCP refused connections, or TCP ignored connections. As explained above, the operational status plug-in module 334 will output recommendations as to the source of the problem device.

As shown in FIG. 5, the plug-in module 334 in this example has a schedule of running every fifteen minutes.

The scheduler module 316 schedules the plug-in module 334 to be run every fifteen minutes based on this schedule (500). The plug-in module 334 then queries the traffic collection database 342 through the data API 314 for information on non-successful connections for each network device over the last fifteen minutes in this example (502). The plug-in module 334 then performs analysis for each of the network devices on whether the non-successful connection rate is too high (504). All information relating to potential affected devices and associated recommendations are sent to the results manager 318 (506). The results manager 318 stores the results and recommendations in the recommendation engine database 306 (508). The results manager 318 also displays the resulting recommendations via the user interface 320 (510).

Figure 6A:
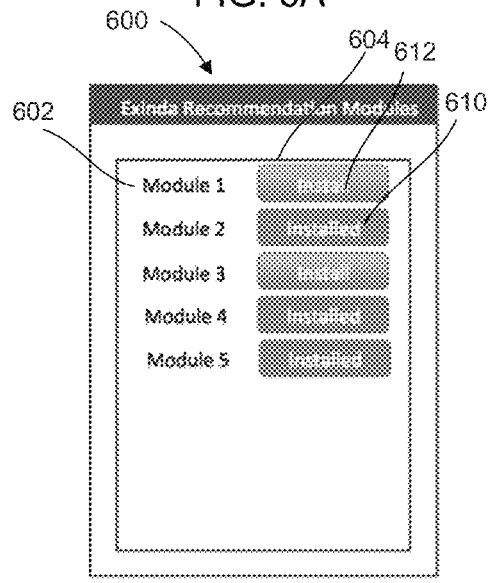
FIG. 6A is an image of a monitoring user interface for the plug-in modules.

FIG. 6A is an image of a user monitoring interface 600 for purposes of monitoring plug-in analysis modules such as the plug-in analysis modules 312 in the recommendation analysis engine 252 in FIG. 3. The monitoring interface 600 is generated by the user interface 320 with application data obtained through the manager API 322 of the module manager 310. The monitoring interface 600 includes a listing of plug-in analysis modules 602 that are available and a status indication field 604. Each of the modules 312 available are listed in the module listing 602. The status indication for each module may include an installed status button 610 or an install button 612. The installed status button 610 indicates that the plug-in analysis module has been loaded and is scheduled for execution by the module manager 310 in FIG. 3. The install button 612 allows a user to install the selected plug-in analysis module thereby allowing the plug-in analysis module to be scheduled by the scheduler module 316. The monitoring interface 600 relates to modules that are installed on the network traffic appliance 120 in FIG. 2.

Figure 6B:
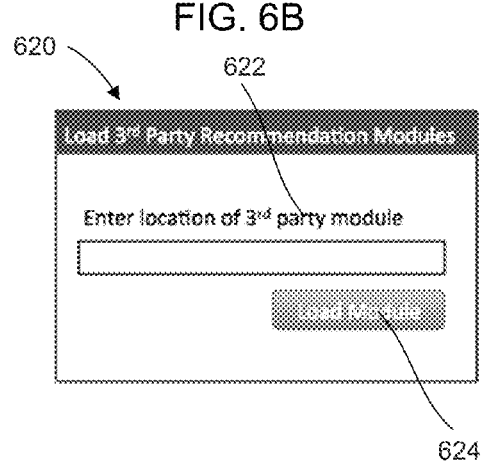
FIG. 6B is an image of a user interface for loading the plug-in modules.

FIG. 6B is an image of a load interface 620 for loading plug-in analysis modules. The load interface 620 includes a search box 622 and a load module button 624. The search box 622 will display accessible memory devices either on the network traffic appliance 120 or any other device accessible through a network such as the LAN 122. Once a desired plug-in analysis module is located in the search box 622, the plug-in analysis module may be loaded for access by the module manager 310 by selecting the load module button 624. The selected module is then added to the list shown in FIG. 6A.

Figure 6C:
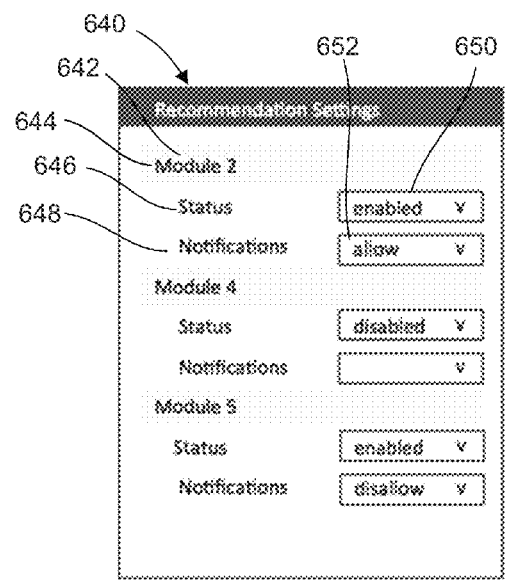
FIG. 6C is an image of a user interface for selecting a recommendation output from the plug-in modules.

FIG. 6C is an image of a recommendation activation interface 640 whether a particular plug-in module is enabled or disabled and whether notifications are allowed or disallowed. The interface 640 includes different module listings 642. The module listings 642 display each plug-in analysis module that is currently installed on the recommendation analysis engine 252. Each listing includes a name field 644 displaying the name of the plug-in analysis module, a status heading 646 showing whether the plug-in analysis module is enabled, and a notifications heading 648 indicating whether recommendations from the module notifications are allowed. The status heading 646 includes an enabled option and a disabled option in a selection field 650 that allows the user to activate and deactivate the plug-in analysis module. The notifications heading 648 includes an allow selection and a disallow selection in a selection field 652, which allows a user to turn on or turn off the recommendations output from the module from being displayed to the user.

Figure 7:
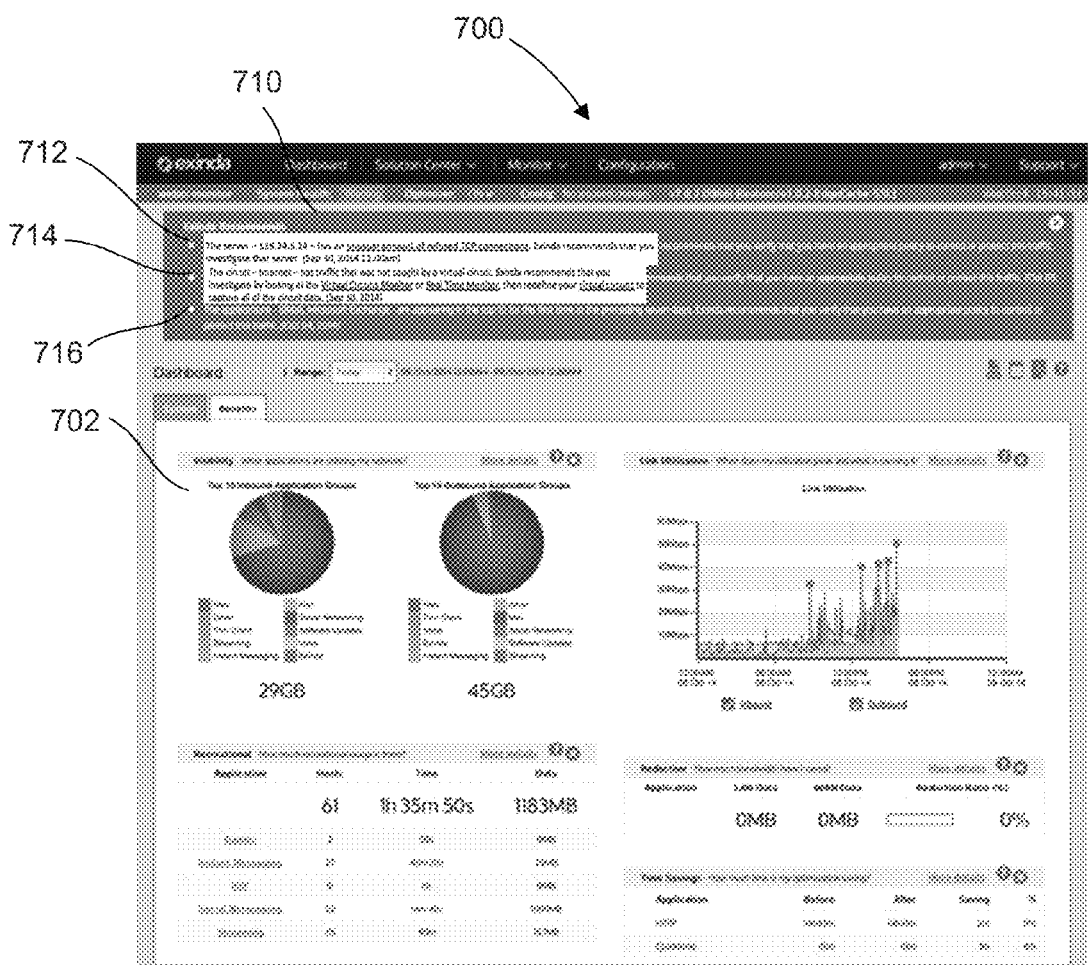
FIG. 7 is an image of a user interface listing recommendations output from the plug-in modules.

FIG. 7 is an image of a screen interface 700 for the outputs and recommendations from the network traffic data gathered by the network traffic appliance 120. The interface 700 allows a user to monitor the performance of the network via a dashboard window 702. A recommendation window 710 lists recommendations from the execution of the plug-in modules 312 in FIG. 3. The recommendation window 710 includes a number of recommendations that are generated by the enabled plug-in analysis modules 312 in conjunction with the results manager API 324 in FIG. 3. The data in the window 710 is generated by the user interface 320 with application data obtained through the API 324 of the results manager 318. Each of the recommendations is enabled by the control interface 640 in FIG. 6C. In this example, the operations plug-in module 334 described above has made a first recommendation 712 that a server has an unusual amount of refused TCP connections and recommends that the user investigate the server. A second recommendation 714 is a result of the improper configuration module 330 in FIG. 3. The example second recommendation 714 states that the Internet network circuit has traffic not caught by a virtual circuit and recommends the user to investigate by a virtual circuits monitor or real-time monitor application run by the network traffic appliance 120 in FIG. 2 and use the results to redefine virtual circuits to capture all circuit data. A third recommendation 716 is output by the traffic trends module 332 in FIG. 3. The third recommendation 716 indicates that a certain application is appearing in the top ten applications for the first time and recommends that the user verifies an appropriate policy is available from the QoS controller 232 in FIG. 2 to control or protect the traffic for the application.

The recommendation analysis engine 252 in FIG. 3 is designed to be run on a single network traffic analysis appliance such as the network traffic appliance 120 in FIG. 1. The recommendation analysis engine 252 may also designed to run the same data analysis plug-in modules 312 on a central management system that is collecting data from multiple network traffic analysis appliances. The difference in such collection by a central management system will be hidden through framework configuration and the data plug-in APIs. For instance the same plug-in data analysis module may be used to create a set of recommendations from the network traffic seen on the network traffic appliance 120 it is running on, or it might be run on a central management system where it is only given access to the data from a single network traffic analysis appliance currently collected by the central management system.

The concepts described above increase the operation of computing devices on the network and the network itself. These benefits include the ability to present recommendations to the user based on data analysis on network data and therefore increase network efficiency. The system includes the ability to extend solutions to network traffic issues by allowing plug-in analysis modules that are managed in a consistent fashion. The system allows plug-in data collection modules to extend the universe of data analysis possible by correlating data from multiple disparate databases and systems. The system also allows coordination of multiple data analysis modules in a consistent manner as related to scheduling, on/off management, and results presentation.

Figure 8:
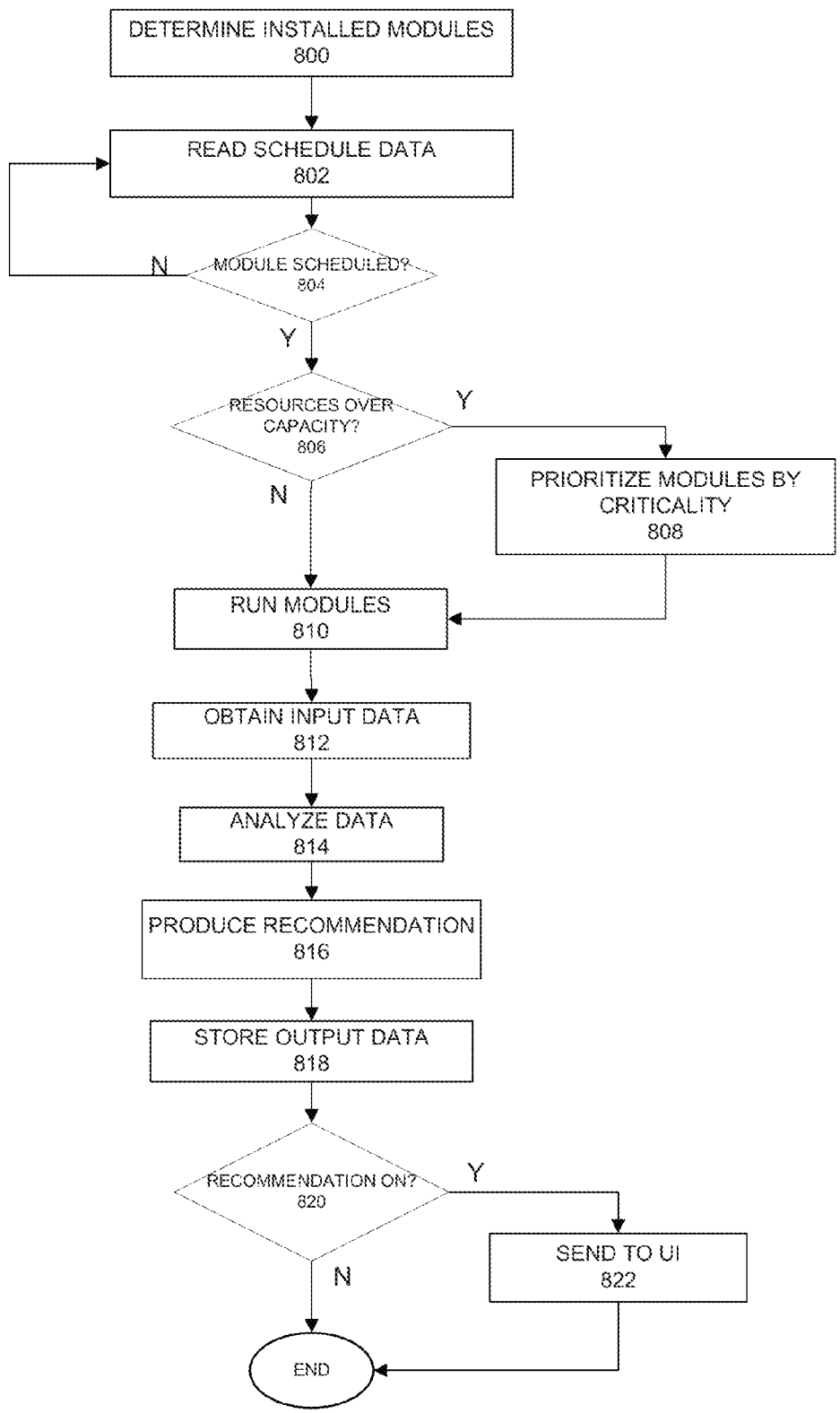
FIG. 8 is a flow diagram showing the operation of the scheduling and execution of the data analysis plug-in modules in the system in FIG. 1.

The process of gathering data analysis from execution of plug-in modules will now be described with reference to FIGS. 1-7 in conjunction with the flow diagram shown in FIG. 8. The flow diagram in FIG. 8 is representative of example machine readable instructions for scheduling and executing plug-in analysis modules for the system in FIG. 1. In this example, the machine readable instructions comprise an algorithm for execution by: (a) a processor, (b) a controller, and/or (c) one or more other suitable processing device(s). The algorithm may be embodied in software stored on tangible media such as, for example, a flash memory, a CD-ROM, a floppy disk, a hard drive, a digital video (versatile) disk (DVD), or other memory devices, but persons of ordinary skill in the art will readily appreciate that the entire algorithm and/or parts thereof could alternatively be executed by a device other than a processor and/or embodied in firmware or dedicated hardware in a well-known manner (e.g., it may be implemented by an application specific integrated circuit (ASIC), a programmable logic device (PLD), a field programmable logic device (FPLD), a field programmable gate array (FPGA), discrete logic, etc.). For example, any or all of the components of the interfaces could be implemented by software, hardware, and/or firmware. Also, some or all of the machine readable instructions represented by the flowchart of FIG. 8 may be implemented manually. Further, although the example algorithm is described with reference to the flowcharts illustrated in FIG. 8, persons of ordinary skill in the art will readily appreciate that many other methods of implementing the example machine readable instructions may alternatively be used. For example, the order of execution of the blocks may be changed, and/or some of the blocks described may be changed, eliminated, or combined.

In FIG. 8, the recommendation analysis engine 252 activates the module manager 310 to determine which plug-in analysis modules 312 are installed (800). The scheduler module 316 then reads the scheduling data from each of the installed plug-in analysis modules 312 (802). The scheduler module 316 determines if a plug-in analysis module is scheduled for the time (804). If a plug-in analysis module is not scheduled, the recommendation analysis engine 252 loops back to reading scheduling data from each of the installed plug-in analysis modules (802). If the plug-in analysis module is scheduled (804), the scheduler module 316 will determine whether there are sufficient hardware and network resources to run all the scheduled plug-in analysis modules (806). If there are not sufficient resources, the scheduler module 316 selects the highest priority plug-in analysis module or modules based on the criticality of the plug-in analysis module (808). The selected plug-in analysis module is then executed by the module manager 310 (810). If there are sufficient resources, all of the scheduled plug-in analysis modules are executed by the module manager 310 (810).

When the plug-in analysis module is run, any required data is obtained through the data API 314 from the databases (812). The plug-in analysis module then performs the analysis on the network traffic data and any other data (814). The plug-in analysis module produces a recommendation based on the specific design of the module (816). The recommendation is stored in the recommendation database 306 in FIG. 3 (818). The results manager 318 then determines whether the user has selected receipt of the recommendation from the module (820). If the user has opted not to receive the recommendation, the routine ends. If the user has opted to receive the recommendation, the recommendation is sent to the user interface manager 320 for output of the recommendation (822) and the routine ends.

Each of these embodiments and obvious variations thereof is contemplated as falling within the spirit and scope of the claimed invention, which is set forth in the following claims.

What is claimed is:

1. A method of analyzing data on network traffic in a network having a plurality of computing devices coupled to a network traffic appliance that routes data to and from the computing devices, the method comprising:

executing a command via a network traffic recommendation engine to install a plug-in network traffic analysis module on the network traffic recommendation engine;
running the network traffic analysis module to obtain selected network traffic data on the network;
analyzing the selected network traffic data via the network traffic analysis module,
correlating data from a plurality of systems including the network to extend the data analysis of the selected network traffic data of the systems;
outputting a recommendation based on the selected network traffic data; and
adjusting a policy based on the recommendation to improve the efficiency of the sending and receiving of network traffic to the plurality of computing devices.

2. The method of claim 1, wherein the recommendation is one of an improved configuration of the network, changing network traffic patterns, and identifying a network computing device which may require maintenance.

3. The method of claim 1, further comprising displaying the recommendation to a user.

4. The method of claim 1, wherein the network traffic analysis module is one of a plurality of network traffic analysis modules installed on the network traffic recommendation engine, each of the network traffic analysis modules obtaining selected network traffic data from the network and outputting a recommendation.

5. The method of claim 4, further comprising a scheduling manager for selecting one or more network traffic analysis modules to be executed before another network traffic analysis module based on the priority of the one or more network traffic analysis modules.

6. The method of claim 5, wherein the priority of the one or more network traffic analysis is determined based on the time sensitivity of the analysis of the network traffic performed by the respective network traffic analysis module.

7. The method of claim 1, wherein the network traffic analysis module interfaces with a database via a data interface API.

8. A system for analysis of network traffic data, the system comprising:

a network having a plurality of network devices exchanging data;
a network traffic management system coupled to the network for managing data traffic on the network; and
a network traffic recommendation engine including a plug-in network data traffic analysis module, the network data traffic analysis module:
obtaining selected network traffic data on the network from the network traffic management system;
analyzing the selected network traffic data;
correlates data from a plurality of systems including the network to extend the data analysis of the selected network traffic data of the systems; and
outputting a recommendation based on the selected network traffic data.

9. The system of claim 8, wherein the network traffic management system adjusts a policy for improving the efficiency of the sending and receiving of network traffic to the plurality of computing devices according to the output recommendation from the network data traffic analysis module.

10. The system of claim 8, wherein the network traffic management system is a central management system, and wherein the network is one of a plurality of networks, wherein the network traffic analysis module analyzes network traffic on the plurality of networks.

11. The system of claim 8, wherein the network traffic management system includes a plurality of network traffic appliances each managing traffic on an affiliated network, the central management system collecting network traffic data on at least one of the plurality of networks.

12. The system of claim 11, wherein the network traffic management system includes a network traffic appliance, and wherein the recommendation engine is on the network traffic appliance.

13. The system of claim 8, wherein the recommendation is one of an improved configuration of the network, changing network traffic patterns, and identifying a network computing device which may require maintenance.

14. The system of claim 8, further comprising a user interface that allows the recommendation to be communicated to a user.

15. The system of claim 8, wherein the network traffic analysis module is one of a plurality of network traffic analysis modules installed on the network traffic recommendation engine, each of the network traffic analysis modules obtaining selected network traffic data from the network and outputting a recommendation.

16. The system of claim 15, further comprising a scheduling manager for selecting one or more network traffic analysis modules to be executed before another network traffic analysis module based on the priority of the one or more network traffic analysis modules.

17. The system of claim 16, wherein the priority of the one or more network traffic analysis is determined based on the time sensitivity of the analysis of the network traffic performed by the respective network traffic analysis module.

18. A network traffic analysis appliance for improving the efficiency of networked computers in processing data, the network traffic appliance comprising:
   a network recommendation engine;
   a network interface to collect network traffic data when coupled to a network;
   a storage device coupled to the network recommendation engine to store collected network traffic data;
   a plug-in module executed by the network recommendation engine, the plug-in module reading data relating to network traffic, analyzing the data, and outputting a recommendation, wherein the module correlates data from a plurality of systems including the networked computers to extend of analyzing the selected network traffic data of the systems; and
   a quality of service controller routing network traffic in response to the recommendation to increase the processing efficiency of the network.

19. A method of analyzing data on network traffic in a network having a plurality of computing devices coupled to a network traffic appliance that routes data to and from the computing devices, the method comprising:
   executing a command by a network traffic recommendation engine to install a plurality of network traffic analysis modules on the network traffic recommendation engine, each of the plurality of network traffic analysis modules obtaining selected network traffic data from the network and outputting a recommendation;
   selecting one of the plurality of network traffic analysis modules;
   running the selected network traffic analysis module to obtain selected network traffic data on the network;
   analyzing the selected network traffic data via the network traffic analysis module;
   outputting a recommendation based on the selected network traffic data; and
   adjusting a policy based on the recommendation to improve the efficiency of the sending and receiving of network traffic to the plurality of computing devices.

20. A system for analysis of network traffic data, the system comprising:
   a network having a plurality of network devices exchanging data;
   a network traffic management system coupled to the network for managing data traffic on the network; and
   a network traffic recommendation engine including a plurality of plug-in network data traffic analysis modules, each of the network traffic analysis modules operable to obtain selected network traffic data from the network and outputting a recommendation, the network traffic management system selecting a network data traffic analysis module from the plurality of network traffic analysis modules, the selected network traffic analysis module:
   obtaining selected network traffic data on the network from the network traffic management system;
   analyzing the selected network traffic data; and
   outputting a recommendation based on the selected network traffic data.

21. A network traffic analysis appliance for improving the efficiency of networked computing devices in processing data, the network traffic appliance comprising:
   a network recommendation engine including a plurality of installed network traffic analysis modules, each of the network traffic analysis modules obtaining selected network traffic data from the network and outputting a recommendation;
   a storage device coupled to the network recommendation engine;
   a network interface to collect network traffic data when coupled to a network;
   a plug-in module selected from the plurality of network traffic analysis modules, the selected plug-in module executed by the network recommendation engine, the plug-in module reading data relating to network traffic, analyzing the data, and outputting a recommendation; and
   a quality of service controller routing network traffic in response to the recommendation to increase the processing efficiency of the networked computing devices.

* * * * *